United States Patent Office 3,839,523
Patented Oct. 1, 1974

3,839,523
METHOD FOR PRODUCING CHIPBOARDS FROM CHIP MIXTURES USING MATERIAL IN POWDER OR FIBER FORM
Hans Ph. Lobenhoffer and Kurt W. Ernst, Gottingen, Germany, assignors to Hutt GmbH, Leingarten, Germany
No Drawing. Filed Mar. 13, 1972, Ser. No. 234,414
Claims priority, application Germany, Mar. 15, 1971, P 21 12 299.6
Int. Cl. B29j 5/00
U.S. Cl. 264—115           3 Claims

ABSTRACT OF THE DISCLOSURE

A method for producing chipboard of the type formed by distributing chips in a mat and then pressing the chips into the desired shape of the board. The method involves the use of wood particles such as grinding dust, sawdust, etc., which are fed between compacting rolls or other pressing surfaces to consolidate the particles. These consolidated particles are then subdivided into chip-shaped compacts which are added to the mat in admixture with the conventional chips.

---

The invention relates to a method of producing chipboards from chip mixtures, bonding agents and other conventional additives, such as water repellants, fungicides, insecticides, plastics or the like, with the use of adhesive-treated and/or non-adhesive-treated material of reduced dimensions in powder or fiber form, more particularly grinding dust, screening residue, sawdust or the like.

In conventional chipboard manufacture large quantities of powdery or fibrous wood particles of reduced dimensions are produced. Woodworking machinery produces sawdust and fibrous wood powder devoid of bonding agent. When the chips or chip mixtures are dried and screened, wood material of similar dimensions is placed apart. As a rule, the finish-pressed flat boards are ground at the end of the manufacturing process, with the result that grinding dust, which contains cured adhesive, is yielded in amounts of from about 10 to 15 percent of board production. It is so far proved impossible to re-use all the said finely divided and very finely divided material produced in board production for boards of satisfactory quality, i.e., to use all the waste in powder form for board manufacture.

The prior art is, therefore, full of attempts and suggestions for making good use of at least some of the powdery and fibrous waste particles in the manufacturing process.

A first group of printed publications (printed German specification R 7,832, German Offenlegungsschrift 1,453,-389, German Auslegeschrifts 1,211,794 and 1,228,798, German Offenlegungsschrift 1,528,232) discloses the use of glued or unglued finely divided and very finely divided material in the outside layers of chipboards. According to the printed German specification R 7,832, the outer layer consists of finely-ground sawdust. The outer layers and central layers are prepared separately, then joined together. German Offenlegungsschrift 1,453,389 deals with the problem of adding grinding dust to a conventional chip mixture which includes an adhesive or other binding agent. According to German Auslegeschrift 1,211,794, wetted particles of wood dust, which may or may not have been glued, can be used in compensating covering layers. According to German Auslegescrift 1,228,798, unglued wood dust is unsuitable for covering layers, and this publication therefore suggests introducing unglued wood dust together with glued wood dust into the covering layers. German Offenlegungsscrift 1,528,232 recommends preparing covering layers from a mixture of finely and very finely divided chips and grinding dust.

A second group of printed publications (German patent specification 1,295,180, German Utility Model 1,919,-319) relates to techniques for improving the surface texture of chipboard. For instance, according to German patent specification 1,295,180, improved surface texture is accomplished when a mat comprising the chips and binding agent is covered by a covering layer consisting of a ground powdery mixture of glue-free wood dust and powdery resin dust. According to German Utility Model 1,919,319, grinding dust containing adhesive is introduced into the outer layers of a board to improve the surface.

According to German Auslegescrift 1,198,539 and German Offenlegungsschrift 1,653,254, water repellants, curing agents, adhesive and fire-inhibiting agents are added to wood dust which is in turn added to the chips to be scattered. The grinding dust serves as a support, e.g. for the flame inhibitor, since the proportion of flame inhibitor in the adhesive cannot be increased beyond certain limits. Of course, this procedure enables only portions of the total amount of fine and very fine waste to be processed.

German Offenlegungsscrift 1,453,397 deals with returning powdery wood waste to the production process and suggests introducing grinding dust into the more inwards layers, e.g., intermediate layers, of the chipboard together with relatively coarse particles of wood, preferably wood chips. As an alternative suggestion, the entire laminated construction is permeated with grinding dust.

The processing of glued and/or unglued wood dust (i.e. with or without binding agent) in chipboard manufacture leads to a number of difficulties, some of which are dealt with the printed publications referred to. Since a chipboard is required to be of symmetrical construction, powdery material on its own or in a chip mixture can be distributed on only the bottom outer layer in mat formation. When powdery material is scattered in other layers, demixing is inevitable, the finer material tending to concentrate in the lower layers. Because of the movements and vibrations of the means conveying the mat to the presses, the fine and very fine material drops by gravity through the laminated structure, and more intensive glueing cannot prevent this separation or demixing. Even if demixing can be tolerated, the resulting board is of asymmetrical construction, with disadvantages so far as the board's ability to maintain an even or plane surface. More particularly, when such a board is affected by moisture, the board becomes curved and warped.

Another difficulty is that introducing powdery material, more particularly into the middle layers of chipboards, inhibits the removal of vapor during hot pressing. The powdery material acts as a sort of filler, clogging the pores and spaces of the structure of the layer concerned, thus causing considerable stoppage of the passages and porous areas which are important for the flow of vapor. The flow of vapor ceases completely if the proportion of wood dust is excessive. The water vapor can then be removed only by diffusion, in which event the speed of the vapor removal is, of course, reduced by several orders of magnitude. Pressing time, therefore, increases and makes the economic and technical viability of the entire production process doubtful.

It is also difficult to compress a mat of chips which contains nothing but powdery material in its surface layers. Greater pressure is needed, with the result that the density of the press finished flat board is high and more raw material is consumed.

The use of powdery material also impairs the hygroscopic and mechanical properties of chipboards. For instance, introducing finely or very finely divided material into chipboard outer layers as recomended by a number of the publications referred to is bound to considerably reduce the tensile strength of such layers, with the result of poor bending and pull-off strength, e.g., because of planking coming away readily. Also, the dimensional stability of such boards is unsatisfactory.

It is, therefore, an object of the invention to disclose a method of producing chipboards of the kind specified, such that all the glued and/or unglued powdery or fibrous material of small dimensions yielded in manufacture can be returned to the manufacturing process, with none of the disadvantages of the prior art. More particularly, this involves the introduction of wood dust inside the boards so as to obviate the disadvantages of powdery outer layers.

According to the invention, to solve these problems in the method of producing chipboards of the kind specified, the material in dust or fiber form is shaped with the use of pressure into discrete tablet-like or chip-like blanks, compacts or briquets, and is added in this form to the chip material in forming of the mats which are pressed into flat chipboards.

This feature makes it possible to provide tablet-like or chip-like members which can be scattered like chips and worked into the board. Since the blanks have the same or substantially the same size and shape as the chips, demixing during conveying is precluded.

Very advantageously, the blanks are shaped with an addition of a consolidation-promoting bonding agent, e.g. urea resin or polyvinyl acetate. An adhesive of the kind which cures completely during shaping of the blanks can be used. For even further advantages, a bonding agent, e.g. urea resin, is added to the blanks and cures partly during shaping of the blanks and partly during the pressing of the blanks and chips together.

Also, before or during or after the shaping of the blanks, the material in dust or fiber form can have added to it a bonding agent which cures only during pressing of the board, such agent preferably being added in a higher proportion than in the case of the other chips of the particular layer concerned. Shaping treatment can be given under conditions such as will activate the self-binding properties of the material in powdery and fibrous form.

Very advantageously, after shaping, the blanks are given further treatment with adhesive, then scattered into the mats, thus ensuring good matching of the blanks to be scattered and of the chips to be scattered or distributed.

The shaping of the blanks can, therefore, be enhanced by adhesives which set immediately under pressure. To increase the strength of the blanks, an additive which must be heated to cure can be used as well. This treatment can be given before or during or after shaping, i.e., before the products according to the invention are returned to the chip flow. It may be convenient in such cases to apply further adhesive to the surface of the cured blanks, possibly after dust removal, so that the products according to the invention are matched to the fresh adhesive-treated chips. If the blanks are adequately consistent, they can be given their curing treatment in the hot press.

Very advantageously, the blanks are introduced in the central and/or intermediate layers of the mat from which the board is pressed. This leads to the layers concerned being of reduced weight and to an advantageous reaction pressure when the board is pressed, since in the subsequent pressing step the material of the blanks does not require the very high compression necessary for the powdery layers of the conventional methods.

Very advantageously, the chip-like blanks have locally the same transverse tensile strength as the chips.

Very advantageously, the shaping of the blanks is adapted to the average shape of the chips of the particular layer concerned; in this case, in the shaping of the blanks, the material in powder or fiber form is brought to the dimensions of average flat chips of up to 18 mm. long, from about 5 mm. up to 10 mm. wide and about one mm. thick. As a rule, blank thickness is greater than the average thickness of the other chips in the layer so as to make sure that the shaped blanks are not destroyed, thus causing dust, during mixing, scattering and conveyance.

Preferably in the shaping of the blanks an endless strip is pressed first, e.g., between opposed pressing rolls of the type used in briquetting, and the strip is then chopped or otherwise subdivided into discrete blanks. This is a simple way of enabling the fine and very fine material yielded in manufacture to be worked up into blanks and to be added *in toto* to the production process. Alternatively, a tabletting method can be used to produce tablet-like elements of from 5 to 10 mm. diameter and from 0.5 to 5 mm. thickness.

Advantageously, before being added to the chip mixture the blanks are given further treatment, more particularly drying and dust removal. This feature improves the cohesion of the blanks. The dust evolved in production of the blanks can readily be returned to the production process at some suitable place. Completely cured blanks pressed with the use of adhesive have proved satisfactory, but they must be given further adhesive treatment before the scattering of the mat. However, the adhesive treatment extends to the surface of the blanks. The adhesive treatment can be given separately or together with the other chip material. Clearly, other adhesives can be used in this version of blank manufacture, more particularly adhesives which are incompatible with the adhesive used for the other chips.

It is immaterial for the purposes of the invention which other additives are used in chipboard production. For instance, water repellants, fungicides, insecticides, etc., can be processed. Plastics and foam plastics can be incorporated in the board. These steps do not disturb the processing of the blanks pressed from powdery or fibrous material.

In addition to providing a means for saving material which would otherwise be wasted, the invention provides a means for reducing pollution problems. Thus, any attempt to dispose of these waste materials by conventional means could lead to serious contamination of the air, water resources, et cetera.

It will be understood that various changes and modifications may be made in the above described invention without departing from the spirit thereof particularly as defined in the following claims.

That which is claimed is:

1. A method of producing a chipboard, wherein chip-shaped wood compacts are included in a mat in admixture with wood chips, comprising:
    (a) mixing a consolidating-promoting bonding agent with wood particles selected from the group consisting of wood grinding dust, screening wood residue and sawdust,
    (b) placing said mixture between opposed surfaces of pressing means,
    (c) compacting said mixture into a consolidated condition,
    (d) subdividing said consolidate mixture into chip-shaped compacts up to 18 mm. long, 5–10 mm. wide and 0.5–5 mm. thick,
    (e) mixing said chip-shaped compacts uniformly together with said wood chips,
    (f) forming said mixture of said compacts and said wood chips into a mat, and
    (g) pressing said mat in a manner to bond said compacts and said wood chips into said chipboard.

2. The method of claim 1 wherein said bonding agent is selected from the group consisting of urea resin and polyvinyl acetate.

3. The method of claim 1 wherein said bonding agent is of the curable type and cures partly during step (c) and partly during step (g).

References Cited

UNITED STATES PATENTS

| | | | |
|---|---|---|---|
| 3,492,388 | 1/1970 | Inglin-Knüsel | 264—122 |
| 3,028,287 | 4/1962 | Greten | 264—122 |
| 3,283,048 | 11/1966 | Hoppeler | 264—122 |

ROBERT F. WHITE, Primary Examiner

J. R. HALL, Assistant Examiner

U.S. Cl. X.R.

264—118, 122